United States Patent
Jentsch et al.

(10) Patent No.: US 10,100,132 B2
(45) Date of Patent: Oct. 16, 2018

(54) PROCESS FOR THE PREPARATION OF POLYMERS CONTAINING AMINO GROUPS EMPLOYING A HETEROGENEOUS IRON CATALYST

(71) Applicant: ARLANXEO Deutschland GmbH, Dormagen (DE)

(72) Inventors: Joerg-Dietrich Jentsch, Leverkusen (DE); Johannes Kaulen, Odenthal (DE); Werner Obrecht, Moers (DE); Rommy Schneider, Attendorn (DE); Christoph Larcher, Duesseldorf (DE); Leonid Kustov, Moscow (RU); Alexander Greish, Moscow (RU); Elena Shouvalova, Moscow (RU); Olga Kirichenko, Moscow (RU)

(73) Assignee: ARLANXEO Deutschland GmbH, Dormagen, DE (US)

( * ) Notice: Subject to any disclaimer, the term of this patent is extended or adjusted under 35 U.S.C. 154(b) by 0 days.

(21) Appl. No.: 15/124,814

(22) PCT Filed: Mar. 6, 2015

(86) PCT No.: PCT/EP2015/054786
§ 371 (c)(1),
(2) Date: Sep. 9, 2016

(87) PCT Pub. No.: WO2015/135863
PCT Pub. Date: Sep. 17, 2015

(65) Prior Publication Data
US 2017/0081430 A1  Mar. 23, 2017

(30) Foreign Application Priority Data
Mar. 10, 2014  (EP) .................................. 14158599

(51) Int. Cl.
C08C 19/02 (2006.01)
(52) U.S. Cl.
CPC .................... C08C 19/02 (2013.01)
(58) Field of Classification Search
CPC ......... C01G 49/009; C08C 19/02; C08F 8/04; B01J 23/745; B01J 23/8906; B01J 25/00
See application file for complete search history.

(56) References Cited

U.S. PATENT DOCUMENTS

| | | | |
|---|---|---|---|
| 2,456,428 A | 12/1948 | Parker | |
| 2,585,583 A | 2/1952 | Pinkney | |
| 3,700,637 A | 10/1972 | Finch, Jr. | |
| 4,452,951 A * | 6/1984 | Kubo ..................... | C08C 19/02 525/329.3 |
| 4,464,515 A | 8/1984 | Rempel et al. | |
| 5,698,662 A * | 12/1997 | Stoelwinder ....... | C08G 73/0213 524/765 |
| 5,902,916 A * | 5/1999 | Ruhl ..................... | B01J 23/462 585/266 |
| 6,040,420 A | 3/2000 | Ebel et al. | |
| 6,121,188 A * | 9/2000 | Breitscheidel ....... | B01J 37/0018 502/300 |
| 6,469,211 B2 | 10/2002 | Ansmann et al. | |
| 6,677,486 B2 | 1/2004 | Ansmann et al. | |
| 7,767,859 B2 | 8/2010 | Amakawa et al. | |
| 8,119,556 B2 | 2/2012 | Amakawa et al. | |
| 2006/0149097 A1* | 7/2006 | Soled ..................... | B01J 23/462 562/487 |
| 2011/0230681 A1 | 9/2011 | Letourneur et al. | |

FOREIGN PATENT DOCUMENTS

DE        329974 A       12/1920

OTHER PUBLICATIONS

Bellefon, C. "Homogeneous and Heterogeneous Hydrogenation of Nitriles in a Liquid Phase: Chemical, Mechanistic, and Catalytic Aspects". Catalysis Reviews Science Engineering (1994) 36 (3), 459-506. Published Online Sep. 23, 2006. Online Journal https://doi.org/10.1080/016149494408009469.
Parent, J.S. "Selectivity of the OsHCl(CO) (O2) (PCy3)2 Catalyzed Hydrogenation of Nitrile-Butadiene Rubber", Journal of Applied Polymer Science (2001), vol. 79, pp. 1618-1626. Department of Chemical Engineering, University of Waterloo, Waterloo, ON, Canada.
Bueche, F. "Tensile Strength of Amorphous Gum Rubbers", Physics Department, University of Dayton, Dayton Ohio, pp. 2-10.
Ullmann's Encyclopedia of Industrial Chemistry, VCH Verlagsgesellschaft, Weinheim, 1993, pp. 239-262. 'VCH Publishers, New York, NY.
European Search Report from co-pending Application EP14158599 dated Jul. 7, 2014, 2 pages.
International Search Report from co-pending Application PCT/EP2015/054786 dated Jun. 3, 2015, 3 pp.

* cited by examiner

Primary Examiner — Robert C Boyle

(57) ABSTRACT

The present invention is related to a process for the preparation of polymers containing amino groups by hydrogenation of nitrile groups containing polymers by heterogeneous catalysis.

19 Claims, No Drawings

PROCESS FOR THE PREPARATION OF POLYMERS CONTAINING AMINO GROUPS EMPLOYING A HETEROGENEOUS IRON CATALYST

FIELD OF THE INVENTION

The present invention is related to a process for the preparation of polymers containing amino groups by hydrogenation of nitrile groups containing polymers by heterogeneous catalysis, a catalyst suitable to carry out said process and the use of said catalyst for carrying out said reaction.

BACKGROUND OF THE INVENTION

The hydrogenation of all or a part of the nitrile groups to amino groups allows the further chemical modification of the polymers and thus to adjust their properties in a very wide range.

Two typical techniques are known for hydrogenation of polymers that are based on homogeneous and heterogeneous catalysts. Although homogeneous hydrogenation provides high conversions, it sometimes causes chain scission and often leads to polymer contamination with the metal due to catalyst extraction difficulties. On the other hand, heterogeneous hydrogenation often yields moderate conversions but is sometimes preferable to homogeneous hydrogenation due to reduced chain scission, no contamination of the polymer, and the ease of catalyst extraction, separation and regeneration. Furthermore, supported heterogeneous transition and noble metal catalysts are recyclable and produce less byproducts than homogeneous extraction products.

Although the hydrogenation of nitriles to produce the corresponding amines has been studied extensively in the low molecular weight range, inter alia it is described in Homogeneous and Heterogeneous Hydrogenation of Nitriles into a liquid phase: Chemical, Catalytic and Mechanistic Aspects. C. de Bellefon, P. Fouilloux, Catal. Rev. Sci. Eng. (1994) 36 (3), 459-506 there are no indications on the transferability of said method to the hydrogenation of nitrile-containing polymers in general and on nitrile rubber in particular. The hydrogenation of nitrile groups of high molecular weight compounds is much less investigated. According to the Journal of Applied Polymer Science (2001) 79, 1618-1626 the hydrogenation of nitrile groups of nitrile-butadiene rubber (NBR) leads to an increase in the molar mass and gelling of the polymer In U.S. Pat. No. 2,456,428 the hydrogenation of polymeric nitriles with at least 4 units was described with any of known hydrogenation catalysts (metallic nickel, colloidal platinum, finely dispersed palladium, copper chromite, oxides or sulfides of Cr, W or Mo; preferably Raney-Nickel). As an example a nitrile-styrene rubber was hydrogenated using a Raney Ni catalyst in benzene with addition of ammonia. But no information was given about the molecular weight before and after the hydrogenation and no quantitative analysis of the conversion of nitrile groups to amino groups was done.

The hydrogenation of the butadiene-acrylonitrile co-polymer with molecular weights up to 100,000 by a two stage process wherein first, the C=C groups are hydrogenated on Pd/C and in the following step the CN fragments are hydrogenated on Ni Raney catalyst is disclosed in U.S. Pat. No. 2,585,583. However, the drastic conditions of 250° C. and 930-950 atm do not allow commercial use of this method. Furthermore, U.S. Pat. No. 2,585,583 described that polymers with a higher molecular weight than 100000 cannot be hydrogenated in a clear fashion.

In U.S. Pat. No. 6,121,188, the hydrogenation of the nitrile groups of nitrile rubber was effected in the presence Co Raney with a particular mesoporous structure. In this case a 15% solution of nitrile rubber having a molecular weight of 3000 was hydrogenated in THF. It is further stated that by said method, the reduction of nitrile groups occurs first and the C=C double bond is hydrogenated thereafter.

U.S. Pat. Nos. 8,119,556 and 7,767,859 disclose methods for producing a low-molecular primary amine by hydrogenation of the corresponding nitrile in the presence of a hydrogenation catalyst. The hydrogenation catalyst contains at least one metal selected from the group consisting of nickel, cobalt and iron and has to be pretreated with at least one agent selected from the group consisting of hydrocarbons, alcohols, ethers, esters and carbon monoxide at 150 to 500° C. before its use in the hydrogenation of nitrile. However, iron-containing catalysts are not preferred and no examples thereof are actually shown.

The use of Raney nickel doped with iron chromium, and zinc as a catalyst for the hydrogenation of low-molecular dinitrile compounds is disclosed in US 2011230681.

JP2002201163 and JP2002205975 describe the continuous hydrogenation of low-molecular nitriles to their corresponding primary amines in a liquid phase over a suspended, activated Raney catalyst based on an alloy of aluminum and at least one transition metal selected from the group consisting of iron, cobalt and nickel, and, if desired, one or more further transition metals selected from the group consisting of titanium, zirconium, chromium and manganese. The hydrogenation is carried out in the absence of ammonia and basic alkali metal compounds or alkaline earth metal compounds.

Hitherto, data on hydrogenation of polymers containing amino groups by heterogeneous catalysis in general is scarce and available data either is limited to the hydrogenation of low-molecular polymers or to the use of mainly noble metals, Co Raney or Ni Raney catalysts. In particular, no actual example of a successful hydrogenation of nitrile side groups of polymers with high molecular weights Mw (weights higher than 200,000) on a heterogeneous catalyst in general and a supported Fe(0) catalyst in particular, has been disclosed.

SUMMARY OF THE INVENTION

The present invention is related to a process for the preparation of polymers containing amino groups via hydrogenation of nitrile groups containing polymers wherein the nitrile groups containing polymers are contacted with hydrogen in the presence of a heterogeneous catalyst containing iron in the oxidation state 0 ($Fe^0$).

The present invention allows a good control of the degree of hydrogenation of C≡N bonds in particular for copolymers having a saturated main chain such as hydrogenated nitrile rubber or for copolymers or having residual double bonds in the range from 0.5 to 20 mol-% based on repeating units derived from diene monomers. The present invention further provides a process for the hydrogenation of nitrile groups in polymers such that the molecular weight of the rubber remains unchanged after the hydrogenation of the nitrile groups into amino groups. The present invention furthermore provides a process for the hydrogenation of nitrile groups of polymers to amino groups which avoids the destruction of the polymer chain during the hydrogenation and which leads to marginal gel formation. Using iron catalysts the reaction can even be carried out in halogenated solvents like monochlorobenzene without dehydrohalogenation of the solvent.

DETAILED DESCRIPTION OF THE INVENTION

The present invention provides a process for the preparation of polymers containing amino groups by hydrogenation of nitrile groups containing polymers. The term polymers as used in this invention, refers to compounds comprising one or more kinds of repeating units wherein the total number of repeating units is 10 or more, preferably 100 or more and most preferably 1000 or more.

Generally, the nitrile groups containing polymers have a Mooney viscosity of from 10 to 180 MU, more preferably of from 20 to 150 MU and most preferably of from 30 to 120 Mooney units. The Mooney viscosity (ML (1+4@100° C.)) is determined at 100° C. by means of a shear disc viscometer in accordance with ASTM D 1646.

The nitrile groups containing polymers typically have a weight average molar mass Mw of from 20,000 to 1.2 Mio g/mol, preferably of from 100,000 to 1 Mio. g/mol, more preferably of from 200,000 to 800,000 g/mol. The weight average molar weight Mw is determined by gel-permeation chromatography.

In a preferred embodiment, the nitrile groups containing polymers have a Mooney viscosity of from 10 to 180 MU and a weight average molar mass Mw of from 20,000 to 1.2 Mio g/mol, preferably a Mooney viscosity of from 20 to 150 and a weight average molar mass Mw of from 100,000 to 1 Mio. g/mol, more preferably a Mooney viscosity of from 30 to 110 and a weight average molar mass Mw of from 200,000 to 800,000 g/mol.

The term nitrile groups containing polymer shall refer to all kinds of synthetic or partially synthetic polymers having nitrile groups, such as Isoprene/Acrylonitrile, Buta-diene/Isoprene/Acrylonitrile, Butadiene/(Meth)acrylate/Acrylonitrile, Butadiene/maleic anhydride/Acrylonitrile, Butadiene/maleic acid/Acrylonitrile, Butadiene/Fumaric acid/Acrylonitrile, Butadiene(Meth)acrylic acid/Acrylonitrile, Butadiene/Itaconic acid/Acrylonitrile, Butadiene/maleic acid half ester/Acrylonitrile, (Meth)acrylate/Acrylonitrile, Styrene/(Meth)acrylate/Acrylonitrile, Butadiene/Styrene/Acrylonitrile, Styrene/Acrylonitrile, α-Methlystyrene/Acrylonitrile, Styrene/α-Methylstyrene/Acrylonitrile, p-Methylstyrene/Acrylonitrile, (Meth)acrylate/Acrylonitrile, Polyacrylonitrile.

In a preferred embodiment, the nitrile groups containing polymer is a nitrile rubber or a hydrogenated nitrile rubber.

Nitrile Rubber and Hydrogenated Nitrile Rubber

For the purposes of the present invention, nitrile rubbers, also referred to as "NBR", are rubbers which are copolymers containing repeating units of at least one α,β-unsaturated nitrile, at least one conjugated diene and optionally 1, 2, 3, 4 or more further copolymerizable monomers.

Such nitrile rubbers and processes for producing such nitrile rubbers are well known, see, for example, W. Hofmann, Rubber Chem. Technol. 36 (1963) 1 and Ullmann's Encyclopedia of Industrial Chemistry, VCH Verlagsgesellschaft, Weinheim, 1993, pp. 255-261.

The conjugated diene in the nitrile rubber has typically from 4 to 16, preferably from 4 to 8, most preferably from 4 to 6 carbon atoms. Particularly preferred the conjugated diene is selected from 1,2-butadiene, 1,3-butadiene, isoprene, 2,3-dimethylbutadiene, piperylene or mixtures thereof. More preferred, the conjugated diene is selected from 1,3-butadiene and isoprene or mixtures thereof. Most preferred, the conjugated diene is 1,3-butadiene.

The α,β-unsaturated nitrile has typically from 3 to 16, preferably from 3 to 8, most preferably from 3 to 5 carbon atoms. Particularly preferably the α,β-unsaturated nitrile is selected from acrylonitrile, methacrylonitrile, ethacrylonitrile or mixtures thereof. Most preferably, the α,β-unsaturated nitrile is acrylonitrile.

In a preferred embodiment of the invention the nitrile rubber is based on acrylonitrile and 1,3-butadiene alone or together with 1,2 or more further comonomers.

The further copolymerizable monomers can be suitably selected by the person skilled in the art. Such monomers can be, for example, aromatic vinylmonomers, preferably styrene, α-methylstyrene and vinylpyridine, fluorine-containing vinylmonomers, preferably fluoroethyl vinyl ether, fluoropropyl vinyl ether, o-fluoromethylstyrene, vinyl pentafluorobenzoate, difluoroethylene and tetrafluoroethylene, or else copolymerizable anti-ageing monomers, preferably N-(4-anilinophenyl)acrylamide, N-(4-anilinophenyl)methacrylamide, N-(4-anilinophenyl)cinnamides, N-(4-anilinophenyl)crotonamide, N-phenyl-4-(3-vinylbenzyloxy)aniline and N-phenyl-4-(4-vinylbenzyloxy)aniline, and also non-conjugated dienes, such as 4-cyanocyclohexene and 4-vinylcyclohexene, or else alkynes, such as 1- or 2-butyne.

Alternatively, the further copolymerizable monomers can be derivatives of α,β-unsaturated carboxylic acids such as esters, or amides of α,β-unsaturated monocarboxylic acids or monoesters, diesters, or amides of α,β-unsaturated dicarboxylic acids.

It is possible to employ esters of the α,β-unsaturated monocarboxylic acids, preferably their alkyl esters and alkoxyalkyl esters. Preference is given to the alkyl esters, especially $C_1$-$C_{18}$-alkyl esters, of the α,β-unsaturated monocarboxylic acids. Particular preference is given to alkyl esters, especially $C_1$-$C_{18}$-alkyl alkyl esters, of acrylic acid or of methacrylic acid, more particularly methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Also preferred are alkoxyalkyl esters of the α,β-unsaturated monocarboxylic acids, more preferably alkoxyalkyl esters of acrylic acid or of methacrylic acid, more particular $C_2$-$C_{12}$-alkoxyalkyl esters of acrylic acid or of methacrylic acid, very preferably methoxymethyl acrylate, methoxyethyl (meth)acrylate, ethoxyethyl (meth)acrylate and methoxymethyl (meth)acrylate. Furthermore, mixtures of alkyl esters, such as those mentioned above, for example, with alkoxyalkyl esters, in the form of those mentioned above, can be employed. Cyanoalkyl acrylates and cyanoalkyl methacrylates in which the C atom number of the cyanoalkyl group is 2-12, preferably α-cyanoethyl acrylate, β-cyanoethyl acrylate and cyanobutyl methacrylate are also suitable. In addition, hydroxyalkyl acrylates and hydroxyalkyl methacrylate in which the C atom number of the hydroxyalkyl groups is 1-12, preferably 2-hydroxyethyl acrylate, 2-hydroxyethyl methacrylate and 3-hydroxypropyl acrylate; fluorine-substituted benzyl-group-containing acrylates or methacrylates, preferably fluorobenzyl acrylates, and fluorobenzyl methacrylate, acrylates and methacrylates containing fluoroalkyl groups, preferably trifluoroethyl acrylate and tetrafluoropropyl methacrylate, as well as α,β-unsaturated carboxylic esters containing amino groups, such as dimethylaminomethyl acrylate and diethylaminoethyl acrylate may be employed.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. More particularly, n-butyl acrylate is used. Particularly preferred alkoxyalkyl esters of the α,β-unsaturated monocarboxylic acids are methoxyethyl (meth)acrylate, ethoxyethyl (meth)acrylate and methoxymethyl (meth)acrylate. More particularly, methoxyethyl acrylate is used.

Particularly preferred hydroxyalkyl esters of the α,β-unsaturated monocarboxylic acids are hydroxyethyl (meth)acrylate, hydroxypropyl (meth)acrylate and hydroxybutyl (meth)acrylate.

Other esters of the α,β-unsaturated monocarboxylic acids that can be used are, for example, polyethylene glycol (meth)acrylate, polypropylene glycol (meth)acrylate, glycidyl (meth)acrylate, epoxy (meth)acrylate, N-(2-hydroxyethyl)acrylamides, N-(2-hydroxymethyl)acrylamides and urethane (meth)acrylate.

Furthermore, it is possible to use monoesters or diesters of α,β-unsaturated dicarboxylic acids.

These α,β-unsaturated dicarboxylic acid monoesters or diesters may be, for example, alkyl esters, preferably $C_1$-$C_{10}$-alkyl, more particularly ethyl, n-propyl, isopropyl, n-butyl, tert-butyl, n-pentyl or n-hexyl esters, alkoxyalkyl esters, preferably $C_2$-$C_{12}$-alkoxyalkyl, more preferably $C_3$-$C_8$-alkoxyalkyl, hydroxyalkyl, preferably $C_1$-$C_{12}$-hydroxyalkyl, more preferably $C_2$-$C_8$-hydroxyalkyl, cycloalkyl esters, preferably $C_5$-$C_{12}$-cycloalkyl, more preferably $C_6$-$C_{12}$-cycloalkyl, alkylcycloalkyl esters, preferably $C_6$-$C_{12}$-alkylcycloalkyl, more preferably $C_7$-$C_{10}$-alkylcycloalkyl, aryl esters, preferably $C_6$-$C_{14}$-aryl esters, these esters being monoesters or diesters, and it also being possible, in the case of the diesters, for the esters to be mixed esters.

Examples of α,β-unsaturated dicarboxylic acid diesters encompass maleic acid dialkyl esters, preferably dimethyl maleate, diethyl maleate, dipropyl maleate and di-n-butyl maleate;

maleic acid dicycloalkyl esters, preferably dicyclopentyl maleate, dicyclohexyl maleate and dicycloheptyl maleate;

maleic acid dialkyl cycloalkyl esters, preferably dimethyl cyclopentyl maleate and diethyl cyclohexyl maleate;

maleic acid diaryl esters, preferably diphenyl maleate;

maleic acid dibenzyl esters, preferably dibenzyl maleate;

fumaric acid dialkyl esters, preferably dimethyl fumarate, diethyl fumarate, dipropyl fumarate and di-n-butyl fumarate;

fumaric acid dicycloalkyl esters, preferably dicyclopentyl fumarate, dicyclohexyl fumarate and dicycloheptyl fumarate;

fumaric acid dialkyl cycloalkyl esters, preferably dimethyl cyclopentyl fumarate and diethyl cyclohexyl fumarate;

fumaric acid diaryl esters, preferably diphenyl fumarate;

fumaric acid dibenzyl esters, preferably dibenzyl fumarate;

citraconic acid dialkyl esters, preferably dimethyl citraconate, diethyl citraconate, dipropyl citraconate and di-n-butyl citraconate;

citraconic acid dicycloalkyl esters, preferably dicyclopentyl citraconate, dicyclohexyl citraconate and dicycloheptyl citraconate;

citraconic acid dialkyl cycloalkyl esters, preferably dimethyl cyclopentyl citraconate and diethyl cyclohexyl citraconate;

citraconic acid diaryl esters, preferably diphenyl citraconate;

citraconic acid dibenzyl esters, preferably dibenzyl citraconate;

itaconic acid dialkyl esters, preferably dimethyl itaconate, diethyl itaconate, dipropyl itaconate and di-n-butyl itaconate;

itaconic acid dicycloalkyl esters, preferably dicyclopentyl itaconate, dicyclohexyl itaconate and dicycloheptyl itaconate;

itaconic acid dialkyl cycloalkyl esters, preferably dimethyl cyclopentyl itaconate and diethyl cyclohexyl itaconate;

itaconic acid diaryl esters, preferably diphenyl itaconate;

itaconic acid dibenzyl esters, preferably dibenzyl itaconate.

Mesaconic acid dialkyl esters, preferably mesaconic acid diethyl esters;

It is possible to use free-radically polymerizable compounds which contain per molecule two or more olefinic double bonds, as further copolymerizable monomers. Examples of such di or polyunsaturated compounds are di or polyunsaturated acrylates, methacrylates or itaconates of polyols, such as, for example, 1,6-hexanediol diacrylate (HDODA), 1,6-hexanediol dimethacrylate, ethylene glycol diacrylate, ethylene glycol dimethacrylate (EGDMA), diethylene glycol dimethacrylate, triethylene glycol diacrylate, butane-1,4-diol diacrylate, propane-1,2-diol diacrylate, butane-1,3-diol dimethacrylate, neopentylglycol diacrylate, trimethylolpropane diacrylate, trimethylolpropane dimethacrylate, trimethylolethane diacrylate, trimethylolethane dimethacrylate, trimethylolpropane triacrylate, trimethylolpropane trimethacrylate (TMPTMA), glyceryl diacrylate and triacrylate, pentaerythritol di, tri and tetraacrylate or -methacrylate, dipentaerythritol tetra-, penta- and hexa-acrylate or -methacrylate or -itaconate, sorbitol tetraacrylate, sorbitol hexamethacrylate, diacrylates or dimethacrylates or 1,4-cyclohexanediol, 1,4 dimethylolcyclohexane, 2,2-bis(4-hydroxyphenyl)propane, of polyethylene glycols or of oligoesters or oligourethanes having terminal hydroxyl groups. As polyunsaturated monomers it is also possible to use acrylamides, such as, for example, methylenebisacrylamide, hexamethylene-1,6-bisacrylamide, diethylenetriaminetrismethacrylamide, bis(methacrylamidopropoxy)ethane or 2-acrylamidoethyl acrylate. Examples of polyunsaturated vinyl compounds and allyl compounds are divinylbenzene, ethylene glycol divinyl ether, diallyl phthalate, allyl methacrylate, diallyl maleate, triallyl isocyanurate or triallyl phosphate.

When comonomers of this kind are employed it is possible to take the polymerization to high conversions and to obtain nitrile rubbers which have a comparatively higher average molecular weight Mw (weight average) and/or Mn (number average), and yet are gel-free.

The proportions of conjugated diene and α,β-unsaturated nitrile in the NBR polymers may vary within wide ranges. The proportion of or the sum of the conjugated dienes is typically in the range from 40 to 90% preferably in the range from 50 to 85%, by weight, based on the overall polymer. The proportion of or the sum of the α,β-unsaturated nitriles is typically 10 to 60%, preferably 15 to 50%, by weight, based on the overall polymer. The proportions of the monomers add up in each case to 100% by weight. Typically, the additional monomers may, depending on their nature, be present in amounts of 0% to 40% by weight, based on the overall polymer. In this case, the corresponding proportions of the conjugated diene or dienes and/or of the α,β-unsaturated nitrile or nitriles are replaced by the proportions of the additional monomers, with the proportions of all the monomers adding up in each case to 100% by weight.

If esters of (meth)acrylic acid are used as additional monomers, they are usually used in amounts of from 1 to 25% by weight.

The nitrogen content of the nitrile rubbers of the invention is determined by the Kjeldahl method in accordance with DIN 53 625. Owing to the content of polar comonomers, the nitrile rubbers are usually soluble in methyl ethyl ketone to an extent of >85% by weight at 20° C.

The glass transition temperatures of the nitrile rubbers and hydrogenated nitrile rubbers of the invention are generally situated in the range from −70° C. to +20° C., preferably in the −60° C. to 10° range.

Preference is given to nitrile rubbers according to the invention which comprise repeating units of acrylonitrile, 1,3-butadiene and optionally of one or more further copolymerizable monomers. Preference is likewise given to nitrile rubbers having repeating units of acrylonitrile, 1,3 butadiene and one or more esters or amides of α,β-unsaturated monocarboxylic or dicarboxylic acids, and in particular repeating units of an alkylester of an α,β-unsaturated carboxylic acid, very particularly preferably of methyl (meth)acrylate, ethyl (meth)acrylate, propyl (meth)acrylate, n-butyl (meth)acrylate, t-butyl (meth)acrylate, hexyl (meth) acrylate, 2-ethylhexyl (meth)acrylate, octyl (meth)acrylate or lauryl (meth)acrylate.

The preparation of such nitrile rubbers is typically performed by emulsion-polymerization of the abovementioned monomers which is adequately known to those skilled in the art and is comprehensively described in the polymer literature. Nitrile rubbers which can be used for the purposes of the invention are also commercially available, e.g. as products from the product range of the trade names Perbunan® and Krynac® from Lanxess Deutschland GmbH.

Hydrogenated Nitrile Butadiene Rubbers:

The term hydrogenated nitrile butadiene rubbers or "HNBR" for short is intended to mean all aforementioned nitrile rubbers which have been subjected to hydrogenation of a part or of all of their C═C double bonds. Preferably, the term refers to hydrogenated nitrile rubbers with a degree of hydrogenation, based on the C═C double bond originating from the conjugated diene, of at least 80, more preferably at least 90, even more preferably at least 95 and most preferably at least 98%. The degree of hydrogenation can be determined, for example, by NMR or by IR spectroscopy.

For hydrogenation the nitrile rubber obtained from emulsion polymerization is converted into a solid rubber. The conversion of the nitrile rubber latex into a solid rubber is carried out by the methods known to the person skilled in the art. The nitrile rubber, from which impurities have been removed, is subsequently either dissolved in an organic solvent, if the impurities were removed from it by the purification methods known to the person skilled in the art, such as precipitation or coagulation and subsequent washing, or the retentate solution obtained by the method according to the present invention, which contains the dissolved and purified nitrile butadiene rubber, directly has a transition metal catalyst suitable for the hydrogenation added to it, and is hydrogenated.

The hydrogenation of nitrile rubber is well known to a person skilled in the art from e.g. U.S. Pat. Nos. 3,700,637; 4,464,515 and DE A3-046,008, DE A3-227,650 and DE A3-329,974.

NBR and HNBR are also collectively referred to as (H)NBR in this application unless indicated otherwise.

Catalyst

The catalyst for the present process for the preparation of the polymers containing amino groups by hydrogenation of nitrile groups containing polymers contains iron in the oxidation state 0 on a support, preferably a porous and/or particulate support. As support materials, oxides such as silicon dioxide, aluminum oxide, titanium dioxide, zirconium dioxide, magnesium oxide and mixtures thereof, graphite, or polymers, for example copolymers of styrene and divinylbenzene can be used. The term silicon oxides extends in principle to all types of silicon dioxide and to synthetic and natural silicates, such as silicate minerals mesosilicates, borosilicates, cyclosilicates, inosilicates, phyllosilicates.

Said term should also include $SiO_2$ is included in its various crystalline or amorphous forms, such as diatomaceous earth, silica, fumed silica, colloidal silica, silica gel or aerogel. Furthermore, should extend to mixed oxides, which contain, based on the weight of the mixed oxide without water of crystallization—at least 50% by weight, preferably at least 75%, more preferably at least 90% by weight and most preferably at least 95 wt % silica and the balance being another oxidic material, such as MgO, CaO, $TiO_2$, $ZrO_2$, $Fe_2O_3$, $Al_2O_3$, or alkali metal. The support material typically comprises less than 500 ppm halogen. In a preferred embodiment the carrier material comprises less than 2 wt %, preferably less than 1 wt %, more preferably less than 500 ppm of alkali metal.

Typically, the support materials have a specific surface area ranging from 20 to 1000 $m^2/g$, preferably in the range of from 80 to 700 $m^2/g$ and particularly preferably in the range of 100 to 600 $m^2/g$ (BET surface area according to DIN 66131). If the catalyst of the invention is in a particulate form, its mean particle size determined by sieve analysis according to DIN 66165 (Method F) is typically in the range of 0.001 mm to 10 mm, preferably in the range of 0.005 mm to 1 mm and particularly preferably in the range of 0.01 mm to 0.1 mm.

The catalyst of the invention can be obtained, for example, by incipient wetness impregnation with a solution or a slurry of one or more iron-containing compounds such as ammonium iron (III) oxalate trihydrate, iron (II) sulfate heptahydrate, iron (II) acetate, ammonium iron (III) citrate, iron (III) citrate, iron (III) nitrate nonahydrate, iron (II) chloride, iron (II) bromide, iron (III) bromide, ammonium iron (II) sulfate hexahydrate, iron (III) chloride, iron (II) chloride, iron (III) chloride hexahydrate, iron (III) acetylacetonate, iron (II) oxalate dihydrate, iron (III) sulfate hydrate, iron (II) sulfate hydrate, iron (III) phosphate, iron (III) phosphate dihydrate, iron (III) oxalate hexahydrate, ammonium iron (III) sulfate or others on a support and subsequent drying. In a preferred embodiment, the supported catalyst is further impregnated with promoter(s) selected from the group consisting of alkaline and earth-alkaline compounds, in particular basic alkaline and earth-alkaline compounds such as e.g. NaOH, KOH, $Na_2CO_3$, $K_2CO_3$, Mg-Citrate. The impregnation can also be effected by washing the supported catalyst with an aqueous solution of the alkaline and/or earth-alkaline compounds. The content of the alkali or earth-alkali metal in the dried catalyst is preferably in the range of from 0.05 to 15 wt %, preferably in the range of 0.5 to 10 wt % and most preferably in the range of 1 to 5 wt % based on the weight of the catalyst. The impregnation with the promoting compound can be carried out directly after impregnation with the metal source and subsequent drying, or alternatively after calcination, prior to or after reduction of catalyst or in any order known to the person skilled in the art.

Subsequently, the catalysts are calcined at temperatures above 150° C., preferably at temperatures of 200 to 600° C., particularly preferably at temperatures of 250 to 450° C. Then, the reduction of iron oxide with hydrogen is carried out at temperatures above 200° C., preferably at temperatures of preferably 350 to 450° C. with a $H_2$ flow of 200 to 600 ml/min, preferably from 300 to 500 ml/min for 1 to 6 hours, preferably for 2 to 4 hours. It is also possible to add small amounts of a noble metal chosen from the group of Pt, Pd and Rh. In such case the amount of the noble metal (by weight) is preferably smaller than the amount of iron on the catalyst, more preferably between 1 and 50%, most preferably between 5 and 40% of the amount of iron. In these cases, the heterogeneous catalyst typically contains Rh, Pd and/or Pt in amounts of from 0.01 to 10% by weight, preferably of from 0.5 to 7% by weight, most preferably of from 1 to 4% by weight. If the heterogeneous catalyst additionally contains Pt, Pd and/or Rh, impregnation with the noble metal can be carried out simultaneously or after the impregnation with the iron compound by contacting the support with a metal salt solution or slurry. All other steps such as drying, calcination and pre-reduction of the catalysts of the invention can be carried out analogously as described above. While the addition of said noble metals may not increase the actual yield of the reduction as such, it can provide improved long-time stability of the catalyst.

The hydrogenation reaction can be carried out in the presence or absence of a solvent which can dissolve the nitrile groups containing polymers at least partially or completely. Suitable solvents are, for example, halogenated organic solvents, preferably chlorinated aromatic, aliphatic and cycloaliphatic solvents such as monochlorobenzene, dichlorobenzene, methylene chloride and chloroform, aliphatic non-cyclic and cyclic ethers such as tetrahydrofuran, dioxane, dibutyl ether, methyl tertbutylether, aliphatic hydrocarbons such as decaline, aromatic hydrocarbons such as toluene, benzene and mixtures of these solvents. Tetrahydrofurane, decalin, dioxane, and mixtures thereof are preferred and monochlorobenzene is especially preferred. The choice of a solvent may be dictated by the solubility of the starting polymer which can appropriately be selected by the person skilled in the art in view of the solubility parameters.

By using the inventive iron catalysts the hydrogenation can be carried out in chlorinated solvents, such as halogenated aromatic, aliphatic and/or cycloaliphatic solvents, preferably in monochlorobenzene, without dehydrochlorination and also at much lower temperatures (e.g. 130° C.) than reported for the hydrogenation of low molecular nitriles. Moreover, gel formation during the hydrogenation can be largely avoided. Furthermore, even at temperatures above 200° C., tetrahydrofurane and dioxane can be used as solvents showing no hydrogenolysis in opposite to Co Raney catalysts.

In a preferred embodiment, the nitrile groups containing polymer is hydrogenated in a solvent in a concentration in the range of from 1 to 30% by weight, preferably from 4 to 20% by weight more preferably 6 to 15% by weight. The concentration of the solution may depend upon the molecular weight of the nitrile groups containing polymers that is to be hydrogenated. Polymers of higher molecular weight are generally more difficult to dissolve.

The amount of the catalyst required for hydrogenation is a function of the temperature of hydrogenation and the desired degree of hydrogenation. The degree of saturation usually increases with the reaction temperature, catalyst concentration and mixing rate. Depending on the desired degree of saturation and the polymer molecular weight, these variables can be adjusted to achieve the desired reaction rate. The catalyst is preferably present in the reaction at a ratio of 0.01 to 1.0 g, more preferably 0.1 to 0.2 g of catalyst per gram of the polymer.

The hydrogenation is generally carried out under hydrogen pressure of from 0.5 MPa to 25 MPa, preferably in the range of from 1.5 MPa to 18 MPa, more preferably in the range of from 3 MPa to 15 MPa and particularly preferably in the range of from 5 MPa to 12 MPa. The reaction temperature is typically in the range of from 50° C. to 250° C., preferably in the range of from 100° C. to 180° C. and most preferably in the range of from 120° C. to 150° C.

The hydrogenation can carried out in any suitable reactor, such as a fixed bed reactor, stirred reactor or spinning disc reactor.

Typically, the reaction time is in the range of from 1 h to 72 h, preferably in the range of from 2 h to 36 h and particularly preferably in the range of from 4 h to 24 h. Preferably, the hydrogenation is carried out in the presence of ammonia or alkaline hydroxides.

After the hydrogenation, the catalyst can be separated by filtration, centrifugation or by a magnetic field such as a permanent magnet or electromagnet. After the addition of antioxidants, the solvent is removed by vapor rotation and for in a drying cabinet. Alternatively, the amino group containing HNBR can be isolated by steam stripping or precipitation with methanol or ethanol and drying afterwards. Alternatively, providing the catalyst in the metallic mesh basket with the reaction mixture circulation through the catalyst basket facilitates the hydrogenation since other devices for the separation of the supported catalyst such as a decanter, a centrifugal separator and a filter are not required at all.

In a typical embodiment, contacting of completely or partially hydrogenated nitrile rubber with 12 MPa hydrogen and an iron catalyst of this invention in the presence of ammonia takes place at 130° C. for 12 to 24 h.

Amino Group Containing Polymers

In a preferable embodiment, the obtained amino group containing polymers have a $NH_2$-content of from 0.01 to 10%, preferably of from 0.1 to 7%, most preferably of from 1 to 5% by weight.

If the nitrile content of the polymer before reduction is known, the amino group content in the hydrogenated product polymer can be determined indirectly from the decrease of the intensity of the CN absorption band.

If the nitrile content of the polymer before reduction is unknown, the amino group content in the hydrogenated product polymer can be determined by preparing a calibration chart from various samples of the same type of polymer, e.g. HNBR, with different acrylonitrile content in order to determine the acrylonitrile content. In addition, the total nitrogen content is determined by elemental analysis to calculate the acrylonitrile content before hydrogenation. This acrylonitrile content should give a specific absorbance according to the calibration curve. From a lower absorbance, one can easily calculate the amino content of the hydrogenated polymer.

Typically, the obtained amino group containing polymers have a gel content of not more than 4%, more preferably not more than 2% and most preferably of less than 1% by weight. The gel content is determined according to ASTM D 3616 by dissolving the amino group containing polymer in of methyl ethyl ketone at 25° C. while stirring, followed by separating the non-soluble content. The separated solid content is then dried, its weight is determined and the gel content is calculated.

A particularly preferred embodiment concerns amino-group containing HNBR possessing the amino- and/or gel content as define above.

Preferably, the nitrile-group containing polymer has an acrylonitrile content of from 18 to 50% by weight.

The amount of remaining double bonds of e.g. HNBR can be determined by the IR-spectroscopic method described in Kautschuk+Gummi. Kunststoffe, Vol. 42 (1989), No. 2, pages 107-110 and Kautschuk+Gummi. Kunststoffe, Vol. 42 (1989), No. 3, pages 194-197.

EXAMPLES

I. Used Materials

The introduction of amino groups by partial hydrogenation of nitrile groups was done with Therban® 3406 of the Lanxess Deutschland GmbH. Therban® 3406 has the following characteristic properties:
Content of acrylonitrile: 34 wt %
Mooney viscosity (ML1+4/100° C.): 63 MU
Residual double bond content: 0.8 Mol %
$M_n$: 91.3 kg/mol
$M_w$: 297 kg/mol
PDI ($M_w/M_n$): 3.3

II. Hydrogenation in THF-dioxane

II.a General Method for Catalyst Preparation:

A 7.6% $Fe^0$ supported catalyst was prepared by impregnating granular $SiO_2$ (silica gel) having a specific surface area of 350 m²/g and an average pore size of 12 nm with an aqueous solution of ammonium iron(III) oxalate trihydrate. In a typical preparation, 10 g of the dried support was impregnated until incipient wetness with 5 ml of the aqueous solution containing 0.55 g of $(NH_4)_3Fe(C_2O_4)_3$ 3 $H_2O$. After impregnation the sample was dried at 60° C. for 12 hours and then calcined at 240° C. for 3 hours. The reduction of metal oxides on the catalyst particles was carried out in a U-shaped reactor heated at a rate of 3° C./min to 420° C. and a hydrogen flow of 100 mL/min. The temperature of 420° C. was held for 3 hours then the reactor cooled down to room temperature while maintaining the hydrogen flow. Under inert conditions, toluene was added and the catalyst particles transferred into a glass vial to prevent oxidation. The iron loading in the sample prepared was 7.6 wt %.

II.b Preparation of Noble Metal Containing Iron Catalyst

Noble metal containing iron catalyst particles were prepared in a two-step impregnation process by initially impregnating the granular $SiO_2$ with an aqueous solution of ammonium trioxalatoferrate trihydrate followed by impregnation with an aqueous solution of optionally tetraaminopalladium chloride monohydrate, tetraaminoplatinum chloride monohydrate or rhodium trichloride trihydrate, respectively before drying, reduction and work-up as described above.

II.c Hydrogenation in THF-dioxane 2.5 g of HNBR (Therban 3406) was dissolved in 45 g of THF-dioxane (1:1) mixture at 50° C. under vigorous stirring. The prepared solution was loaded in the autoclave (the HNBR concentration, 5% mass) 2.5 g of the catalyst (typical particle size 0.05-0.1 mm) was transferred under argon into an autoclave which previously has been purged twice with argon and hydrogen. The autoclave was filled with 0.8 MPa ammonia and the initial $H_2$ pressure in the autoclave was 5 MPa. After heating to 220° C., the pressure in the autoclave increased to about 10 MPa. The duration was typically 8 h but could be varied from 5 h to 200 h. Stirring was effected by a screw. After the reaction the catalyst was filtered off or removed by a strong magnet and the solution of the polymer was allowed to stay under the IR lamp to remove the solvent. No hydrogenolysis of the THF:dioxane mixture was observed by chromatographic analysis. The results of the hydrogenation of HNBR (5% solution in THF/Dioxane, 1:1) with different catalysts at 220° C. for 24 h are presented in Table 1.

Co Raney catalyst was tested under the same conditions as a reference example.

TABLE 1

| Example | 1 | 2 | 3 | 4 | 5 | reference |
|---|---|---|---|---|---|---|
| catalyst | 7.6 wt. % Fe/SiO₂ | 0.7% Pd + 7.6% Fe/SiO₂ | 3% Pd + 7.6% Fe/SiO₂ | 3% Pt + 7.6% Fe/SiO₂ | 3% Rh + 7.6% Fe/SiO₂ (two step impregnation) | Co Raney |
| CN-group conversion [%] | 17.8 | 16.9 | 15.5 | 7.6 | 5.3 | 1.2 |
| Gel content | Traces* | Traces* | Traces* | Traces* | Traces* | Traces* |

*<1% (<0.01 g per 1 g of the polymer) as determined by optical measurement.

Although the mixed noble metal and iron catalysts led to a lower CN-group conversion than the catalyst containing only iron, they still achieved a significant higher conversion than the Co-Raney catalysts and can be expected to provide better long-term performance than the catalyst containing only iron.

III. Hydrogenation in Monochlorobenzene

III.a Preparation of Catalysts:

B1) 7.2% Fe/SiO₂

185.6 g silica pellets (Norpro SS 61138 with a surface area of 250 m²/g and pore diameter of 12 nm from Saint Gobain) were impregnated with 194.8 ml of an aqueous solution containing 112.65 g ammonium iron(III) oxalate trihydrate and dried for 12 h at 60° C. The impregnated carrier was calcined at 240° C. for 3 hours and subsequently reduced at 420° C. for 3 h under a H₂-flow of 166 ml/min to yield a catalyst containing 7.2% Fe on SiO₂.

B2) 7.2% Fe and 4.8 wt % Na₂O/SiO₂

185.6 g silica pellets (Norpro SS 61138 with a surface area of 250 m²/g and pore diameter of 12 nm from Saint Gobain) were impregnated with 194.8 ml of an aqueous solution containing 112.65 g ammonium iron(III) oxalate trihydrate, dried for 12 h at 60° C. and subsequently was impregnated with 150 g of 25 g NaOH/l and dried at 60° C. again. Afterwards the catalyst was calcined at 240° C. for 3 hours and then it was reduced at 420° C. for 3 h under a $H_2$-flow of 166 ml/min to yield a catalyst containing 7.2% Fe and 4.8 wt % $Na_2O$ on $SiO_2$.

temperature for 24 h. After cooling down to room temperature the reaction mixture was removed from the autoclave, was filtrated by a BHS-pocket meter TMG 400, the solvent removed in vacuo and the product dried at 50° C. in a vaccum drying cabinet. The gel content, Mooney viscosity and the acrylonitrile content of the product were determined and from the latter the conversion of nitrile groups and the amino content of 3.7%. The results are shown in Table 2.

TABLE 2

| Example | Temp. [° C.] | Therban conc. | Pressure [bar] | Pressure after heating [bar] | Time [h] | Catalyst | CN conversion [%] | Gel content [%] | Mooney viscosity [ME] |
|---|---|---|---|---|---|---|---|---|---|
| 6 | 130 | 12% | 120 | 164 | 24 | B1)* | 11.1 | 3.8 | 77.4 |
| 7 | 130 | 12% | 120 | 158 | 24 | B2) | 11 | 0.8 | 73.7 |
| 8 | 130 | 12% | 120 | 160 | 24 | B3) | 10.5 | 0.8 | 69.6 |
| 9 | 130 | 12% | 120 | 178 | 24 | B4) | 8.3 | 0.9 | 71.2 |
| 10 | 130 | 12% | 120 | 165 | 24 | B5) | 9.3 | 0.7 | 72.2 |
| 11 | 130 | 12% | 120 | 163 | 24 | B5/B6)** | 8.4 | 2.0 | 66.8 |

*B1 contained 0.41 wt % water
**crushed and sieved 50:50 w/w catalyst mixture of B5) and B6), particle size 100-300 μm B3) 7.2% Fe and 4.5 wt % $Na_2O/SiO_2$
185.6 g silica pellets (Norpro SS 61138 with a surface area of 250 $m^2/g$ and pore diameter of 12 nm from Saint Gobain) were impregnated with 194.8 ml of an aqueous solution containing 112.65 g ammonium iron(III) oxalate trihydrate, dried for 12 h at 60° C. and was calcined at 240° C. for 3 h. Subsequently it was impregnated with 150 g of 25 g NaOH/l and dried at 120° C. Afterwards the catalyst was reduced at 420° C. for 3 h under a $H_2$-flow of 166 ml/min to yield a catalyst containing 7.2% Fe and 4.5 wt % $Na_2O$ on $SiO_2$.

B4) 7.2% $Fe/Al_2O_3$
100 g alumina spheres (Sasol Alumina Spheres 1.7/210 Mg7 SM) was impregnated with 69 ml of an aqueous solution containing 60.69 g ammonium iron(III) oxalate trihydrate and dried for 12 h at 60° C. The impregnated carrier was calcined at 240° C. for 3 hours and subsequently reduced at 420° C. for 3 h under a $H_2$-flow of 166 ml/min to yield a catalyst containing 7.2% Fe on $SiO_2$.

B5) 7.2% $Fe/Al_2O_3$
100 g alumina support material (BASF AL-4126 E1/8) was impregnated with 69 ml of an aqueous solution containing 60.69 g ammonium iron(III) oxalate trihydrate and dried for 12 h at 60° C. The impregnated carrier was calcined at 240° C. for 3 hours and subsequently reduced at 420° C. for 3 h under a $H_2$-flow of 166 ml/min to yield a catalyst containing 7.2% Fe on $SiO_2$.

B6) 7.2% Fe and 2.9 wt % $Na_2O/Al_2O_3$:
After calcination 52 g of catalyst B5) was impregnated with 25 g NaOH/l and dried at 120° C. Afterwards the catalyst was reduced at 420° C. for 3 h under a $H_2$-flow of 100 l/h $H_2$ to yield a catalyst containing 7.2% Fe and 2.9 wt % $Na_2O$ on $Al_2O_3$.

III.b Hydrogenation of HNBR
52 g Therban 3406 were dissolved in 381 g (344 ml) monochlorobenzene via stirring for 1 to 2 h at 60° C. and introduced into a dry autoclave (700 ml). 26 g of one of the above catalysts B1) to B6) and 22 g ammonia were added and 12 MPa hydrogen applied. Then, the autoclave was heated in an isobaric fashion to 130° C. and stirred at this

The invention claimed is:

1. A process for the preparation of polymers containing amino groups, the process comprising hydrogenating —C≡N bonds of hydrogenated nitrile rubber into amino groups by contacting the hydrogenated nitrile rubber with a heterogeneous catalyst in the presence of hydrogen, wherein the heterogeneous catalyst contains iron in the oxidation state Fe(0), and the iron is supported on porous and/or particulate material.

2. The process according to claim 1, wherein the heterogeneous catalyst further contains a noble metal chosen from the group consisting of platinum, palladium and rhodium.

3. The process according to claim 2, wherein:
the iron content by weight of the heterogeneous catalyst is 1 to 25% by weight, and
the heterogeneous catalyst further contains 0.01 to 10% by weight of a noble metal chosen from the group consisting of platinum, palladium and rhodium.

4. The process according to claim 3, wherein:
the iron content is 3 to 15% by weight; and
the noble metal is palladium, and is present in the catalyst in an amount of 1 to 4% by weight.

5. The process according to claim 1, wherein the heterogeneous catalyst is particulate and has particles having a diameter of 0.001 mm to 1 mm.

6. The process according to claim 1, further comprising producing the catalyst by a method comprising:
impregnating a support material, with a solution or a slurry of one or more iron-containing compounds to obtain supported iron catalyst, and
reducing the supported iron catalyst with hydrogen at temperatures above 200° C.

7. The process according to claim 1, wherein the hydrogenation of the nitrile groups is carded out at an absolute hydrogen pressure of 0.5 MPa to 25 Mpa.

8. The process according to claim 1, wherein the hydrogenation of the nitrile groups is carried out at a temperature of 50° C. to 250° C.

9. The process according to claim 1, wherein a weight ratio of the heterogeneous catalyst to the polymer is 0.01:1 to 2.0:1.

10. The process according to claim 1, wherein the iron content by weight of the heterogeneous catalyst is 1 to 25% by weight.

11. The process according to claim 1, wherein the heterogeneous catalyst contains Rh, Pd and/or Pt in amounts of 0.01 to 10% by weight.

12. The process according to claim 1, wherein the hydrogenated nitrile rubber has an acrylonitrile content of 18 to 50% by weight.

13. The process according to claim 1, further comprising separating the catalyst from the reaction mixture by means of filtration, a magnetic field separation method, or a centrifugal separation method.

14. The process according to claim 1, wherein the hydrogenation is carried out in the presence of a solvent.

15. The process according to claim 1, wherein:
the heterogeneous catalyst has an iron content of 1 to 25% by weight;
a weight ratio of the heterogeneous catalyst to the polymer is 0.01:1 to 2.0:1; and
the hydrogenation of the nitrile groups is carried out at an absolute hydrogen pressure of 0.5 MPa to 25 Mpa, a temperature of 50° C. to 250° C., and in the presence of an organic solvent.

16. The process according to claim 15, wherein:
the polymer has an acrylonitrile content of 18 to 50% by weight;
the heterogeneous catalyst has an iron content of 3 to 15% by weight, is particulate with particles having a diameter of 0.001 mm to 1 mm, and further comprises 0.01 to 10% by weight of a noble metal chosen from the group consisting of platinum, palladium and rhodium;
the weight ratio of the heterogeneous catalyst to the polymer is 0.05:1 to 1:1; and
the hydrogenation of the nitrile groups is carried out at an absolute hydrogen pressure of 1.5 MPa to 18 MPa, and a temperature of 100° C. to 180° C., and the solvent comprises a halogenated organic solvent.

17. The process according to claim 16, wherein:
the heterogeneous catalyst has an iron content of 5 to 10% by weight, the iron is supported on a support material selected from the group consisting of silicon oxide, aluminum oxide, titanium dioxide, zirconium dioxide, magnesium oxide or a mixture thereof, the particles of the heterogeneous catalyst have a diameter of 0.005 mm to 0.2 mm, and the noble metal is present in an amount of 0.5 to 7% by weight;
the weight ratio of the heterogeneous catalyst to the polymer is 0.1:1 to 0.2:1;
the hydrogenation of the nitrile groups is carried out at an absolute hydrogen pressure of 3 MPa to 15 MPa, a temperature of 120° C. to 150° C., and the solvent comprises a chlorinated aromatic solvent, a chlorinated aliphatic solvent, and/or chlorinated cycloaliphatic solvent; and the process further comprises producing the catalyst by a method comprising:
impregnating the support material with a solution or a slurry of one or more iron-containing compounds to obtain supported iron catalyst, and
reducing the supported iron catalyst with hydrogen at temperatures above 200° C.

18. The process according to claim 17, wherein:
the particles of the heterogeneous catalyst have a particle diameter of 0.01 mm to 0.1 mm;
the support material comprises silicon oxide, and the supported iron catalyst is reduced with the hydrogen at temperatures of 350 to 450° C.;
the noble metal is palladium, and is present in the catalyst in an amount of 1 to 4% by weight;
the hydrogenation is carried out in a fixed bed reactor, stirred reactor or spinning disc reactor;
the absolute hydrogen pressure is 4 MPa to 12 MPa;
the solvent is monochlorobenzene;
the one or more iron-containing compounds comprise at least one of ammonium iron (III) oxalate trihydrate, iron (II) sulfate heptahydrate, iron (II) acetate, ammonium iron (III) citrate, iron (III) citrate, iron (III) nitrate nonahydrate, iron (II) chloride, iron (II) bromide, iron (III) bromide, ammonium iron (II) sulfate hexahydrate, iron (III) chloride, iron (II) chloride, iron (III) chloride hexahydrate, iron (III) acetyiacetonate, iron (II) oxalate dihydrate, iron (III) sulfate hydrate, iron (II) sulfate hydrate, iron (III) phosphate, iron (III) phosphate dihydrate, iron (III) oxalate hexahydrate, and ammonium iron (III) sulfate; and
the contacting of the polymers with the catalyst in the presence of the hydrogen and the solvent process produces a reaction mixture, and at least after the hydrogenation, the process further comprises separating the catalyst from the reaction mixture by means of filtration, a magnetic field separation method, or a centrifugal separation method.

19. A process for the preparation of polymers containing amino groups, the process comprising hydrogenating —C≡N bonds of nitrile rubber into amino groups by contacting the nitrile rubber with a heterogeneous catalyst in the presence of hydrogen, wherein the heterogeneous catalyst contains 1 to 25 wt % iron in the oxidation state Fe(0), the iron is supported on porous, particulate material having particles with a diameter of 0.001 mm to 1 mm, and the hydrogenation is carried out in the presence of a solvent in a fixed bed reactor, stirred reactor or spinning disc reactor.

* * * * *